US008650069B2

(12) United States Patent  (10) Patent No.: US 8,650,069 B2
Mason, Sr. et al.  (45) Date of Patent: Feb. 11, 2014

(54) IRRIGATION WATER MANAGEMENT SYSTEM

(75) Inventors: Lex M. Mason, Sr., Dallas, TX (US);
Matthew E. Piper, Dallas, TX (US);
Michael B. Bruner, Wylie, TX (US);
Donald L. Cooper, Rowlett, TX (US);
William L. Savelle, Osprey, FL (US)

(73) Assignee: Telsco Industries, Inc., Garland, TX (US)

( * ) Notice: Subject to any disclaimer, the term of this patent is extended or adjusted under 35 U.S.C. 154(b) by 225 days.

(21) Appl. No.: 12/807,185

(22) Filed: Aug. 30, 2010

(65) Prior Publication Data

US 2011/0137827 A1 Jun. 9, 2011

Related U.S. Application Data

(60) Provisional application No. 61/283,504, filed on Dec. 3, 2009.

(51) Int. Cl.
*G06Q 10/00* (2012.01)

(52) U.S. Cl.
USPC ............................................. 705/7.35

(58) Field of Classification Search
USPC ............................................. 705/7.35
See application file for complete search history.

(56) References Cited

U.S. PATENT DOCUMENTS

| | | | |
|---|---|---|---|
| 5,173,855 A | 12/1992 | Nielsen et al. | |
| 5,227,067 A | 7/1993 | Runyon | |
| 5,227,068 A | 7/1993 | Runyon | |
| 6,453,215 B1 | 9/2002 | Lavoie | |
| 6,453,216 B1 * | 9/2002 | McCabe et al. | 700/284 |
| 6,950,728 B1 | 9/2005 | Addink et al. | |
| 7,058,478 B2 | 6/2006 | Alexanian et al. | |
| 7,058,479 B2 | 6/2006 | Miller | |
| 7,412,303 B1 * | 8/2008 | Porter et al. | 700/284 |
| 7,532,954 B2 | 5/2009 | Evelyn-veere | |
| 7,711,454 B2 | 5/2010 | Addink | |
| 2003/0183018 A1 * | 10/2003 | Addink et al. | 73/861.69 |
| 2005/0279856 A1 * | 12/2005 | Nalbandian et al. | 239/76 |
| 2006/0027677 A1 * | 2/2006 | Abts | 239/67 |
| 2006/0161309 A1 | 7/2006 | Moore et al. | |
| 2007/0293990 A1 | 12/2007 | Alexanain | |
| 2008/0058995 A1 | 3/2008 | Holindrake et al. | |
| 2009/0281672 A1 * | 11/2009 | Pourzia | 700/284 |
| 2009/0314862 A1 * | 12/2009 | Bauman et al. | 239/743 |
| 2009/0326723 A1 | 12/2009 | Moore et al. | |
| 2010/0100247 A1 | 4/2010 | Nickerson et al. | |
| 2010/0251807 A1 * | 10/2010 | Morton | 73/73 |
| 2012/0036091 A1 * | 2/2012 | Cook | 705/412 |

OTHER PUBLICATIONS

Kumar, M., Bandyopadhyay, A., Raghuwanshi, N.S., and Singh, R., "Comparative Study of Conventional and Artificial Neural Network-Based ETo Estimation Models," Irrig Sci (2008) 26:531-545.*

* cited by examiner

*Primary Examiner* — Nathan Erb
(74) *Attorney, Agent, or Firm* — Rudolph J. Buchel, Jr.

(57) ABSTRACT

The efficiency of an irrigation system on a property is determined as a difference between the actual water usage at a property and the irrigation water need of the plant on the property. Data for the property are received including at least the location and irrigation area of the property. A reference evapotranspiration value for the property is determined using the solar radiation data derived from the location of the property. The irrigation water need of the property is then calculated from the reference evapotranspiration value and area. The irrigation water need is compared to the actual water use at the property to determined the efficiency of the irrigation system operating thereon.

24 Claims, 9 Drawing Sheets

| Month | Actual Irr Water Usage | | Estimated Water Use Goals | | Difference | |
|---|---|---|---|---|---|---|
| | Gallons/Acre | Monthly irrUse (gal) | Gallons/Acre | Monthly irrUse (gal) | Gallons/Acre | Monthly irrUse (gal) |
| January | 82,614 | 941,800 | 34,594 | 394,367 | 48,020 | 547,433 |
| February | 130,439 | 1,487,000 | 37,005 | 421,857 | 93,434 | 1,065,143 |
| March | 173,561 | 1,978,600 | 64,481 | 735,088 | 109,080 | 1,243,512 |
| April | 214,939 | 2,450,300 | 67,128 | 765,254 | 147,811 | 1,685,046 |
| May | 249,474 | 2,844,000 | 72,367 | 824,987 | 177,106 | 2,019,013 |
| June | 359,482 | 4,098,100 | 84,949 | 968,420 | 274,533 | 3,129,680 |
| July | 546,140 | 6,226,000 | 100,905 | 1,150,313 | 445,236 | 5,075,687 |
| August | 488,825 | 5,572,600 | 89,777 | 1,023,452 | 399,048 | 4,549,148 |
| September | 456,430 | 5,203,300 | 66,506 | 758,167 | 389,924 | 4,445,133 |
| October | 503,649 | 5,741,600 | 65,239 | 743,723 | 438,410 | 4,997,877 |
| November | 215,035 | 2,451,400 | 41,571 | 473,908 | 173,464 | 1,977,492 |
| December | 76,368 | 870,600 | 35,596 | 405,799 | 40,772 | 464,801 |
| | 3,496,956 | 39,865,300 | 760,117 | 8,665,336 | 2,736,838 | 31,199,964 |

FIG. 10

Zone 1

| | Category | Rating | | Programming | |
|---|---|---|---|---|---|
| 1 | Visibility | Low | | Sprinkler Type | Spray Heads |
| 1 | Water Use | Low | | Plant Type | Cool Turf |
| 2 | Plant Appearance | Average | | Soil Type | Clay Soil |
| 1 | Action Required | Near Future | | Slope | 5 |
| | Issues: | | | More/Less | 10% |
| | Heads too close to hard surfaces | | | | |
| | Heads misting or fogging | | | | |

Zone 2

| | Category | Rating | | Programming | |
|---|---|---|---|---|---|
| 1 | Visibility | Low | | Sprinkler Type | Spray Heads |
| 1 | Water Use | Low | | Plant Type | Cool Turf |
| 2 | Plant Appearance | Average | | Soil Type | Clay Soil |
| 3 | Action Required | Immediate Action | | Slope | 5 |
| | Issues: | | | More/Less | 10% |
| | Pipe Break | | | | |
| | Heads too close to hard surfaces | | | | |
| | Heads misting or fogging | | | | |

Zone 3

| | Category | Rating | | Programming | |
|---|---|---|---|---|---|
| 1 | Visibility | Low | | Sprinkler Type | Spray Heads |
| 2 | Water Use | Medium | | Plant Type | Cool Turf |
| 2 | Plant Appearance | Average | | Soil Type | Clay Soil |
| 3 | Action Required | Immediate Action | | Slope | 5 |
| | Issues: | | | More/Less | 10% |
| | Pipe Break | | | | |

IRRIGATION WATER MANAGEMENT SYSTEM

CROSS-REFERENCE TO RELATED APPLICATIONS

The present application is related to the following co-pending U.S. patent applications and claims the benefit of priority to U.S. provisional patent application entitled, "Irrigation Water Management System", having application Ser. No. 61/283,504, and filed on Dec. 3, 2009, currently pending; which is assigned to the assignee of the present invention. The above identified application is incorporated by reference herein in its entirety.

The present application is related to the following co-pending U.S. patent applications:

U.S. patent application entitled, "Irrigation Flow Converter, Monitoring System and Intelligent Water Management System", having application Ser. No. 12/150,201, and filed on Apr. 24, 2008, currently pending; and U.S. patent application entitled, "Intelligent Rain Sensor for Irrigation Controller", having application Ser. No. 12/150,172, and filed on Apr. 24, 2008, currently pending;

which are assigned to the assignee of the present invention. The above identified applications are incorporated by reference herein in their entirety.

BACKGROUND OF THE INVENTION

The present invention relates generally to irrigation water management. More particularly, the present invention relates to a system, method and software program product for creating an accurate irrigation water need model and utilizing the irrigation watering model for evaluating the efficiency of an irrigation system.

Irrigation systems are extremely well known and useful mechanisms for providing for the watering needs of turf, plants and other types of foliage above the amount that is naturally available from precipitation. In this increasingly urbanized world, a customized landscape of turf, ornamentals and meticulously placed trees can inspire the illusion of mood for residents, employees and even passersby to the property. The proper management of campus green space can not only increase the value of the property, but also create an environment more conducive to home-ownership. Properly designed it can increase the productivity of workers, suggest an expansive showground for sportsmen and provide a relaxed and open setting for shoppers. However, green space is not inexpensive. Premium turf grass may cost upwards of $40,000 per acre (over $60,000 for special purpose facilities like golf courses and other types of fee-based sports complexes). Landscape trees are three to four times the cost of turf and the cost of shrubbery, ornamentals and landscape plants may exceed the cost of turf by ten fold. A facility may allocate $5,000-$20,000 per acre monthly for maintaining a premium landscape, with the cost of irrigation water consuming up to half of the maintenance budget.

As a consequence, during construction most facilities devote significant resources to the professional design and installation of irrigation systems, and most acquire reasonably state of the art irrigation components. The objective is for the irrigation system to operate trouble-free for a number of years prior to re-evaluating the system and its components. The affirmation of these objectives is further reinforced by the unsurpassed reliability of many professional grade irrigation components. The life expectancy of professional grade electronic irrigation controllers and spray heads exceed ten years, excluding failures due to lightning or damage. Even the more failure prone irrigation components, such as irrigation valves, regularly provide a maintenance free service for over five years. The fallacy in this thinking is that a single irrigation component failure or even operating inefficiently may skew the operating efficiency of the entire system, thereby wasting valuable water resources and costing the property owner much more than might have been spent on a comprehensive maintenance program.

For many commercial properties, a groundskeeper is responsible for maintaining the irrigations system. It's not uncommon for a commercial property, such as a shopping center, corporate headquarters or a commercial or public office building to operate multiple irrigation controllers, each irrigation controller is connected to multiple irrigation zones, usually between 24 and 48 zones. Thus, the groundskeeper may be responsible for the well being of plants in several hundred separate irrigation zones. Since the prime concern is the aesthetics, the operator adjusts the irrigation time duration for each zone sufficiently long to avoid wilting or browning. If the plants in a zone appear to be under watered, the groundskeeper increases the irrigating duration for that zone until the plants appear healthy. To a large extent, monitoring the operation of the irrigation system is often relegated to checking the appearance of the plants, turf and other greenery in the irrigation zones. The expense of the irrigation water is often ignored until budget time or unless the occurrence of a catastrophic failure, such as a pipe break. By then, the damage of an inefficiently operated irrigation system may have already been done.

What is needed is a comprehensive metric which would enable the property owner to gauge the historic efficiency of the irrigation system. Furthermore, what is needed is a dynamic irrigation model that would enable a property owner to compare the actual irrigation water used at the property to an estimate of the plants' water needs. Finally, what is needed is an uncomplicated mechanism that would enable a property owner to tract costs, in water amounts and money, and to project the return on investment for upgrades to more environmentally friendly irrigation components.

BRIEF SUMMARY OF THE INVENTION

The present invention is directed to a system, method and software product for determining the efficiency of an irrigation system operating on a property. The efficiency of an irrigation system on a property is determined as a difference between the actual water usage at a property and the irrigation water need of the plant on the property. Data for the property are received including at least the location and irrigation area of the property. A reference evapotranspiration value for the property is determined using the solar radiation data derived from the location of the property. The irrigation water need of the property is then calculated from the reference evapotranspiration value and area. The irrigation water need is compared to the actual water use at the property to determine the efficiency of the irrigation system operating thereon.

BRIEF DESCRIPTION OF THE SEVERAL VIEWS OF THE DRAWINGS

The novel features believed characteristic of the present invention are set forth in the appended claims. The invention itself, however, as well as a preferred mode of use, further objectives and advantages thereof, will be best understood by reference to the following detailed description of an illustrative embodiment when read in conjunction with the accompanying drawings wherein:

Other features of the present invention will be apparent from the accompanying drawings and from the following detailed description.

DETAILED DESCRIPTION OF THE INVENTION

In the following description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following description is, therefore, not to be taken in a limiting sense. For clarity of exposition, like features shown in the accompanying drawings are indicated with like reference numerals and similar features as shown in alternate embodiments in the drawings are indicated with similar reference numerals.

Currently, property managers have no acceptable metric for evaluating the amount of water used at a property for irrigation. Operators usually set the irrigation zone run times to disperse sufficient water so that the plants appear healthy. The amount of water is usually metered by the irrigation time interval set at the irrigation controller. Converting the irrigation time interval to irrigation water volume is problematic for operators. This often results in the plants receiving much more water that they require for good health. Thus, irrigation system operation is typically very inefficient, resulting in huge cost overruns for irrigation water. Furthermore, evaluating the operation of the irrigation system is even more difficult as the operator has no accurate water usage goal from which to compare the actual amount of water actually being used for irrigation. Hence, it is impossible for the operator to determine how efficiently the irrigation system is dispersing water to the plants on the property. That is, how much irrigation water is being used by the plants and how much is wasted as runoff, oversaturated soil, evaporated directly into the atmosphere from the sprayers or from walls, sidewalks and drives. These problems are particularly severe for legacy irrigation system (those five year or older) that were developed without any particular attention to conservation.

Additionally, because operators do not fully understand the water needs of the plants on the property, it is often difficult to diagnose hidden irrigation system malfunctions such as faulty valves and cracked or broken irrigation pipes. These problems are often overlooked in cases where the plants seem relatively healthy; any increase in water usage that is detected is attributed to normal plant water usage. Applicants of the present invention have discovered that the combination of inefficient irrigation operation and poor irrigation system maintenance result in over watering of between 300 percent and 600 percent on a typical property over the summer growing season and fall over seeding period. Consequently, in the Dallas-Ft. Worth metroplex geographic region, these inefficiencies cost a commercial property owner having just seven acres of irrigated green space over $30,000.00 annually.

In accordance with various aspects of the present invention many of these shortcomings are alleviated through the use of a dynamic evapotranspiration irrigation water need model for a property. The aim of the irrigation water need model is to accurately assess the amount of irrigation water that is needed by healthy plants on a property over the amount of rainfall that is actually received at the property. Then, the irrigation water need model is compared to the actual irrigation water usage at the property to determine the efficiency of the irrigation system and to calculate an estimate of waste (both in water amount and monetary cost to the property owner). The present irrigation water need model provides the irrigation system operator with an accurate metric from which to assess the operation of the specific irrigation system operating at the property. At a minimum, irrigation time intervals can be adjusted to correspond to the model. Furthermore, through the use of the irrigation water needs model, the irrigation system operator has a metric from which to determine which, if any, irrigation system upgrades to employ at the property, and provides a means for calculating an accurate "return on investment" for irrigation system components and professional irrigation services based on savings resulting from efficient operation of the property's irrigation system. Finally, once the operator can correctly assess the operating efficiency of the property's irrigation system, any discrepancies between the actual water usage and the dynamic evapotranspiration irrigation water need model for the property can be attributed to hidden irrigation system malfunctions such as faulty valves and cracked or broken irrigation pipes. Thus, the irrigation water need model gives the operator the justification to devote property assets to diagnose irrigation water losses resulting from obscure and hard to detect sources.

Figure 1:
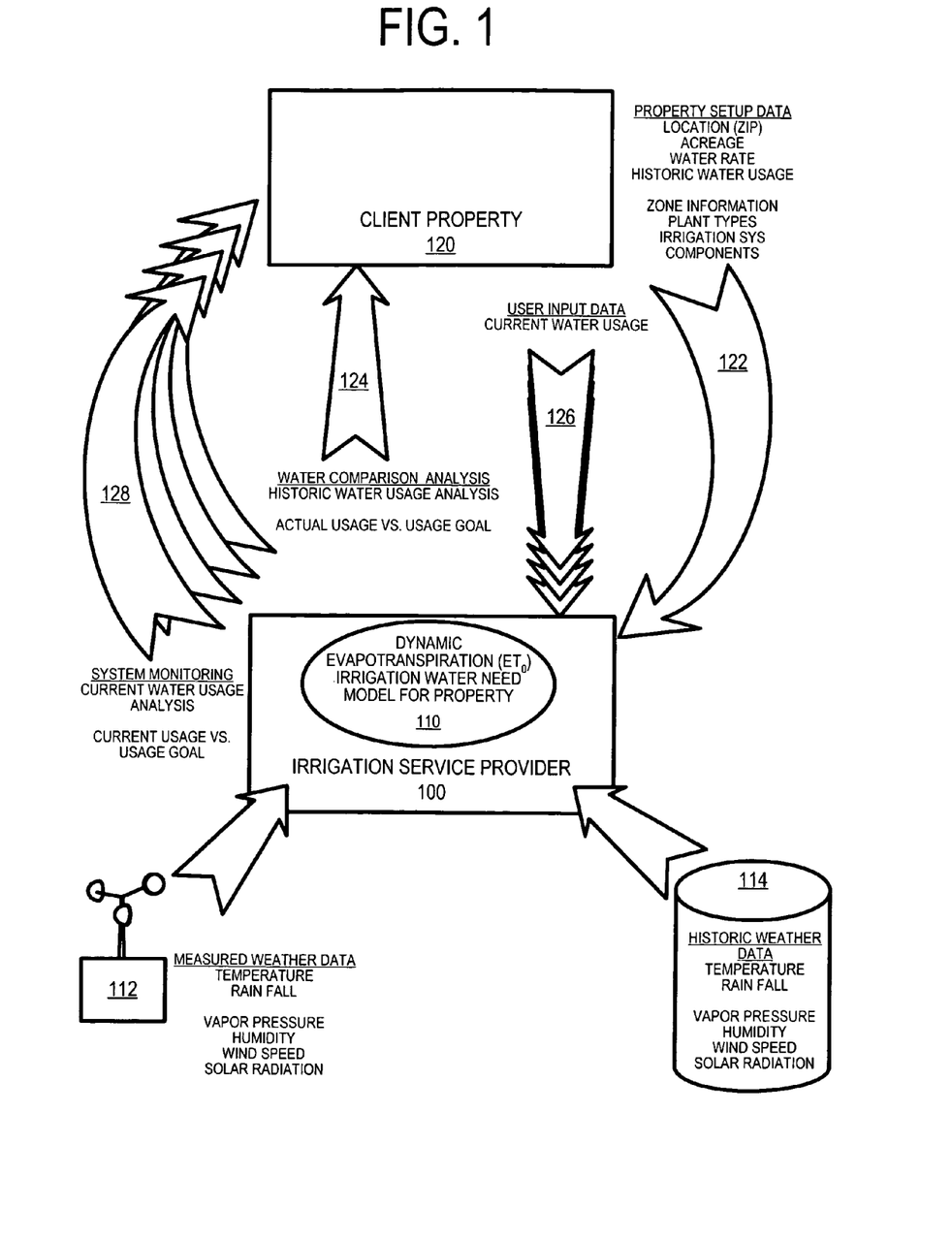
FIG. 1 is a logical diagram of the relationship between an irrigation service provider and property manager (operator) useful for understanding the construction of an irrigation water need model for setting water usage goals on a property in accordance with one exemplary embodiment of the present invention.

FIG. 1 is a logical diagram of the relationship between an irrigation service provider and property manager (operator) useful for understanding the construction of an irrigation water need model for setting water usage goals on a property in accordance with one exemplary embodiment of the present invention. Essentially, irrigation service provider 100 utilizes a plant water needs algorithm for calculating the amount of water needed by plants on the property (usually measured in inches). Many water need algorithms are known in the irrigation industry as discussed in U.S. Pat. No. 6,314,340 entitled, "Irrigation Controller", issued Nov. 6, 2001, U.S. patent application entitled, "Irrigation Flow Converter, Monitoring System and Intelligent Water Management System", having application Ser. No. 12/150,201, and filed on Apr. 24, 2008, currently pending; and U.S. patent application entitled, "Intelligent Rain Sensor for Irrigation Controller", having application Ser. No. 12/150,172, and filed on Apr. 24, 2008, currently pending, each of which assigned to the assignee of the present application and incorporated herein by references in the entirety.

Most of these algorithms attempt to calculate the evapotranspiration for plants on a property. The term "evapotranspiration" (ET) refers to the amount of water a plant uses or needs in order to maintain growth. The cumulative amount of water needed by for a property is understood as the ET (inches or millimeters) times the area of the property ($ft^2$, $m^2$ or $mm^2$). The evapotranspiration algorithm utilizes climatic information in calculating an evapotranspiration value, commonly including temperature, solar radiation, wind speed, and vapor pressure or humidity. This climatic information is generally available from a historic weather database or may be collected dynamically by a full service weather station. In either case, the information is processed in one of these complex algorithms to calculate the evapotranspiration value. One example of such an algorithm recognized in the agriculture industry for accuracy in measuring evapotranspiration using weather station collected climatic information is the well-known Penman-Monteith or modified Penman equations. It is recognized that the results from the Penman-Monteith, modified Penmans or other equation evapotranspiration value calculated from that weather station climatic information is valid only for a property proximate to the weather station that collected the climatic. Therefore, in order to make full use of the Penman-Monteith, modified Penmans algorithms, the property should be equipped with a full service weather station.

Other, less rigorous but equally accurate water need algorithms assumes certain climatic information, thereby allowing for the measurement of only a subset of the climatic information needed by the Penman-Monteith or modified Penmans algorithms. For example, the Hargreaves equation utilizes only the amount of extraterrestrial radiation (RA) received at a site for determining an evapotranspiration value. See, George H. Hargreaves, "Defining and Using Reference Evapotranspiration", Journal of Irrigation and Drainage Engineering, vol. 120, no. 6, November/December 1994. The RA value reflects the evaporation resulting from the amount of the sun's radiation which reaches the earth's surface. While this extraterrestrial radiation causes evaporation value to change daily (due to day-to-day weather changes, the tilt in the earth's axis and the yearly rotation of the earth about the sun), it is recognized that a value calculated based on the latitude of the site provides a suitable approximation. Tables providing historic monthly latitude based extraterrestrial radiation value information are published and widely available from a number of sources with reference to location (e.g., longitude/latitude, ZIP code, physical address, etc.). Real mean time temperature data is used to supplement the historic RA values for $ET_0$ calculation. Thus, the only climatic information collected at the site for the Hargreaves equation to determine a reference evapotranspiration value is local temperature data (high, low and differential for estimating a mean temperature). The remaining components of the Hargreaves equation are advantageously constants. It should therefore be understood that $ET_0$ from the Hargreaves equation will be far less complicated than the Penman-Monteith or modified Penmans algorithms, but somewhat less accurate. However, results from the Hargreaves equation are far less susceptible in deviations and errors in measuring the climatic information.

In either case, the intent is for irrigation service provider 100 to create a dynamic evapotranspiration ($ET_0$) irrigation water need model for property, that in turn is used to determine the amount of irrigation water needed for maintaining the health of plants at the property. The amount of water needed by the plants at the property above the rainfall amount is the amount of irrigation water that is needed by the plants at the property.

The present dynamic evapotranspiration ($ET_0$) irrigation water need model may operate in two modes, the first is for creating a historical water usage analysis for the property and the second is to establish monthly water usage goals that are dynamically updated by real time weather information for the property and that may be accessed periodically by the operator for comparing the water actually used at the property with the water goals computed by the dynamic evapotranspiration ($ET_0$) irrigation water need model.

In operation, irrigation service provider 100 receives historical weather data from weather archive source 114. The historical weather data includes at least solar radiation and rainfall amounts for the property. With the weather information, irrigation service provider 100 employs one of the water usage algorithms to calculate the water need of the plants on the property over relevant time periods, usually monthly to coincide with the monthly water usage/billing statements. By subtracting the amount of water supplied to the plants by rainfall, the dynamic evapotranspiration ($ET_0$) irrigation water need model is created for the property. In addition to historical weather data, setup data is also received by irrigation service provider 100 from client property 120, including at least the location of the property, (longitude/latitude, ZIP code, address, etc.) and the irrigated area of the property, but may include the historical water usage and water rates (arrow 122). With this additional information, a historical water usage analysis for the property is created for the property manager (arrow 124), from the dynamic evapotranspiration irrigation water need model and the actual water usage data for the property. See FIG. 8 which depicts a diagram of the actual water usage 802 (monthly water usage/billing statements) and plant water need 804 (dynamic evapotranspiration ($ET_0$) irrigation water need model). See also the tabular listing of the actual irrigation water usage data and estimated water use goals (plant water need) depicted in FIG. 9. Both figures diagrammatically represent the irrigation watering inefficiency of the legacy irrigation system in that the actual irrigation water usage exceeds the plant water need by over 450%. Consequently, the property manager can then compare the historic irrigation water usage at the property, with the historic irrigation water need of the plants on the property to determined the historical efficiency of the irrigation systems at the property on a per time unit basis.

In addition, by applying the water usage rates for the property, the cost of the historic irrigation water usage can be compared to the estimated cost of the irrigation water needed by the plants for the same time period as a metric to estimate the monetary cost of the irrigation inefficiency. From that economic comparison, the property manager can make an informed decision to the necessity or extent of upgrading the legacy irrigation system, potential monetary savings and return on investment for new irrigation equipment and professional irrigation services. This is especially important for legacy irrigation systems that meter irrigation water only on the basis of irrigation time. Newer, ET-type irrigation controllers, such as the SmartLine series of irrigation controllers (trademarked by and available from Telsco Industries, Inc., Garland, Tex.) operate by estimating a reference $ET_0$ in a similar manner as the creation of the present dynamic evapotranspiration ($ET_0$) irrigation water need model for property. Hence, meeting monthly water usage goals derived from the irrigation water usage model is much less manually intensive as the irrigation controller automatically adjusts irrigation watering times based on plant watering needs.

The present dynamic evapotranspiration ($ET_0$) irrigation water need model not only provides a means for analyzing the historical water usage and making economic comparisons necessary for justifying expenditures, but it also provides a mechanism for dynamically updating the evapotranspiration ($ET_0$) irrigation water need model with near real time weather information for the property for monitoring the watering efficiency of the irrigation system. Here, irrigation service provider 100 receives additional weather information from weather station 112 for use with dynamic evapotranspiration ($ET_0$) irrigation water need model. The type of weather information needed by irrigation service provider 100 depends on the ET algorithm used for the model, for instance the Hargreaves equation needs only temperature information at the property to supplement solar radiation data from the historic weather data 114. If the model uses a more complicated water need algorithms, such as the Penman-Monteith or modified Penmans algorithms, then weather station 112 should provide additional measurements, such as humidity, wind speed, barometric pressure, etc., as needed by the algorithm.

It should be mentioned that one aim of the irrigation water need model is to accurately predict a water usage goal for the property based on plant water needs. Therefore, the water need algorithm used for the model should be selected based on the weather data that is available at the property. If weather station 112 is not in the general vicinity of the property, or does not measure data needed for a more complicated water need algorithm, then the Hargreaves equation should be used for constructing the water need model In any case, irrigation service provider 100 continually updates the water usage model with weather information from weather station 112, from which current monthly water usage goals are calculated. These are available to the property manager for viewing or may be combined with the most recent water usage, input by the user (arrow 126) for creating a current water usage vs. usage goals comparison, including a current cost analysis (arrow 128). With this information, the operator can accurately assess the operation of the irrigation system and more correctly determine whether to perform extensive and sometimes expensive diagnostics to identify a hidden irrigation system malfunction such as a faulty valve and cracked or broken irrigation pipe.

With further regard to the logical diagram depicted in FIG. 1, it is expected that irrigation service provider 100 is a transparent computer service accessible to the property manager at a remote location via the Internet. The property manager logs into the service using a secure login and password for viewing, updating, entering data and/or receiving irrigation water need model results and analysis. The present diagram depicts the client property as a homogeneous area under the control of a single irrigation controller. However, as a practical matter, many commercial properties employ multiple irrigations controllers, each of which may be separately metered and receive a separate monthly water usage/billing statement. Each irrigation controller, in turn, controls multiple irrigation zones. Each separate zone may be a unique combination of sprinkler type, plant type, soil type, surface slope and local water correction factor. Thus, an even more accurate irrigation water need model might be subdivided by irrigation controller-area and then each controller-area might be further subdivided by zone-area-plant types to better estimate the water needs of every type of plant in the separate irrigation zone-areas of the separate irrigation controller. Thus, the irrigation water need model would more accurately represent the separately programmed irrigation zone on each controller, see, for example, the programming section of the summary diagram for controller A in irrigation zones 1-3 depicted in FIG. 10.

Finally, the present dynamic evapotranspiration irrigation water need model provides homeowners, users, operators and property owners with a heretofore unrealized tool for investigating inefficiencies in their respective irrigation systems. Prior art time-base irrigation controllers are problematic because most users simply cannot accurately adjust irrigation times corresponding to the plant water needs. Typically, the amount of irrigation water far exceeds that plants needs. Consequently, diagnosing irrigation watering inefficiency in the prior art is largely relegated to observation, if the plants look healthy, then the system was assumed to be running efficiently. Obvious malfunctions such as broken sprinkler heads were dealt with, but other inefficiencies usually went undetected. Most property owners and operators simply do not have the skills necessary to calculate plant water need and then convert that amount to an irrigation time, so operators relied on the plant appearance as a measure of irrigating efficiency. The fallacy with this method is, of course, using the appearance of plants as a measure of efficiency encourages excessive over watering, which results in unnecessarily high water costs. By understanding how much irrigation water is being wasted, the property manager can not only justify upgrading irrigation equipment to ensure that the property's irrigation system operates based on the plant water need, and not merely irrigation time, but also provides a baseline from which to investigate unobvious problems.

Figure 2:
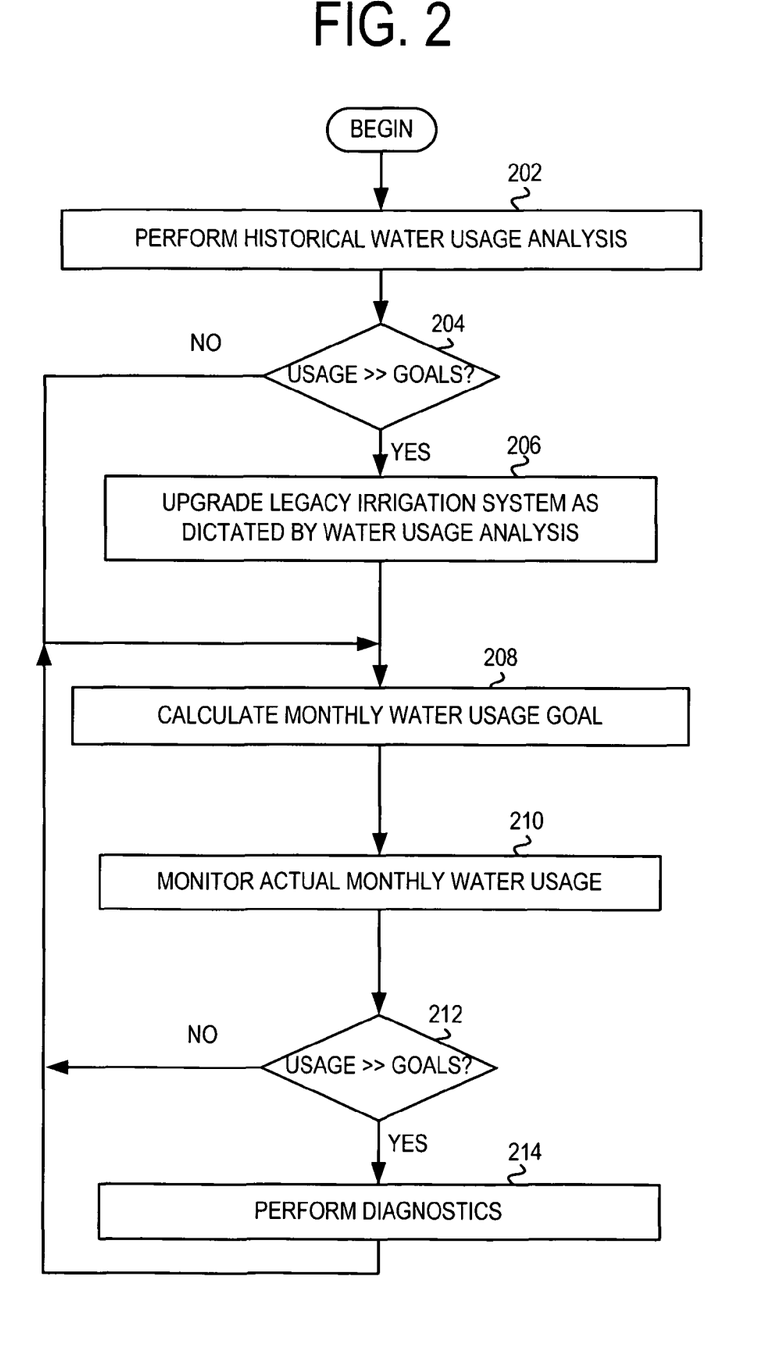
FIG. 2 is a flowchart depicting a process for operating an irrigation system efficiently using the dynamic evapotranspiration irrigation water need model in accordance with one exemplary embodiment of the present invention.

FIG. 2 is a flowchart depicting a process for operating an irrigation system efficiently using the dynamic evapotranspiration irrigation water need model in accordance with one exemplary embodiment of the present invention. The present method is a simplified overview of the process for implementing an irrigation water need model that is intended to demonstrate the effectiveness of using the model. Initially, a dynamic evapotranspiration irrigation water need model is constructed for the property. Using the model, the historical operation of the irrigation system can be analyzed (step 202). Historical water usage data may be compared with the estimated plant water needs of virtually any time period that water usage and weather data for the property is available, however at least a year of data should be compared. The amount of irrigation water actually used at the property is compared to the amount of water that was needed by the plants (the water use goal) over the same time period. Significant discrepancies between the actual water usage and water use goals are a measure of the inefficiency of the irrigation system, so the water usage is compared to the goal (step 204). While, at first blush, these steps may seem unnecessary, the comparison of historic water usage provides the property owner with monetary justification for upgrading legacy irrigation components to more efficient components (step 206).

Furthermore, when equated to monetary terms, an accurate return on investment (ROI) can be determined, as well as the payoff period.

Regardless of whether or not the historic water usage analysis justifies upgrading, from here the process enters an iterative loop of monthly comparisons for monitoring the operational efficiency of the irrigating system. Here, the dynamic evapotranspiration irrigation water need model is be used to calculate monthly water usage goals based on plant watering need (step 208). Typically, steps 208 through 214 are performed monthly, however, the time period for the comparison is not crucial to the present invention. Any time frame may be selected, but ideally it should be some multiple of an irrigation cycle, for instance a week, two weeks, etc. For the identical time period used with the water usage goals, monitor the actual water usage (step 210). As discussed above, the actual water usage is usually taken from a water bill, but may also be taken from a water meter to the irrigation controller. Here again, the amount of water actually used on the property is compared to the water need (goal) of the plants (step 212). If the actual water usage is comparable to the watering goal, the process reverts to step 208 for the next monthly cycle (or another time period). However, significant over watering at this point in the process may be presumed to be a result of a malfunction and diagnostics performed on the system or an irrigation profession contacted to investigate the discrepancy. Alternatively, over watering detected at this point might result from improper operation of the irrigation controller. While state of the art ET-type irrigation controllers can accurately calculate the water need of plants, other factors may cause over watering, or even under watering. Many advanced irrigation controllers, such as the SmartLine series, have several programming options to more efficiently disburse irrigation water at each zone. These include selecting the Sprinkler Type, Plant Type, Soil Type, Slope and a local constant for Increasing/Decreasing the calculated irrigation amount. Of the five programming parameters, only the Sprinkler Type, Plant Type and Increasing/Decreasing parameters alter the amount of water delivered to the property. The Soil Type and Slope parameters generally shorten the duration of a long irrigation cycle to several short intervals to avoid runoff. Once values for the parameters have been correctly selected and a period of efficient operation has been established, discrepancies between actual usage and the watering goal are almost certainly a result of a malfunction.

Figure 3:
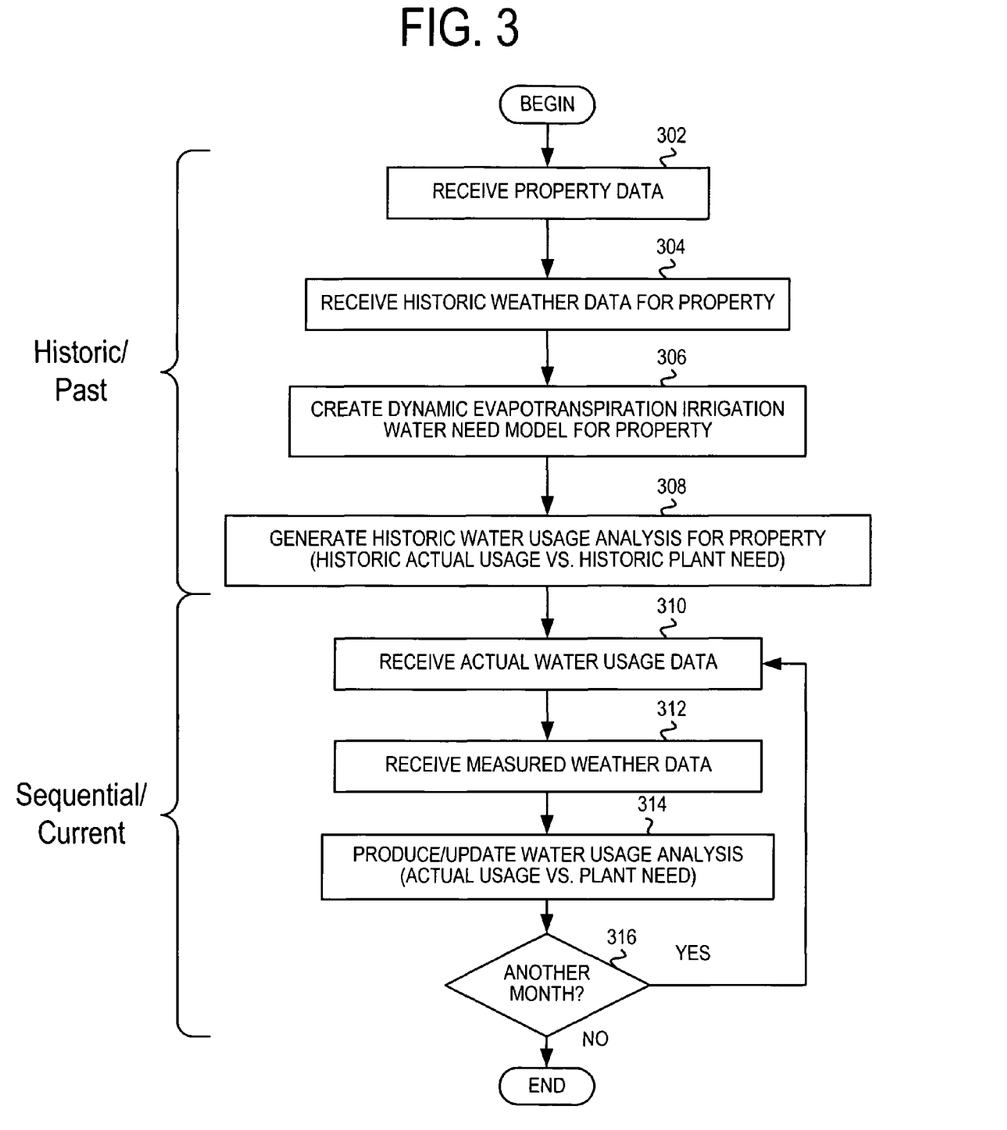
FIG. 3 is a flowchart depicting a process for assessing the operating efficiency of an irrigation system in accordance with one exemplary embodiment of the present invention.

FIG. 3 is a flowchart depicting a process for assessing the operating efficiency of an irrigation system in accordance with one exemplary embodiment of the present invention. The process depicted in FIG. 3 is similar is some aspect to that discussed above with regard to the process in FIG. 2, but with the inclusion of constructing the water need model necessary for the historic water usage analysis and for monitoring/analyzing the monthly water usage. In accordance with some aspects of the present invention, the process depicted in FIG. 3 process is performed entirely at irrigation service provider 100. The process begins by receiving property information from client property 120 (step 302). At a minimum, the property information includes the location of the property (longitude/latitude, ZIP code, address, etc.), size of the irrigated landscape, but may also include plant types. If a historical water usage analysis is to be made, then the property data should also include historical water usage from monthly water usage/billing statements. Next, historic weather data is received for the property (step 304). The type of weather data needed depends on the type and complexity of water need algorithm used in the irrigation water need model. Less complex algorithms, such as the Hargreaves equation need only solar radiation and temperature, more complex algorithms, such as the Penman-Monteith or modified Penmans algorithms, utilize wind speed, humidity and pressure for calculating the reference evapotranspiration value ($ET_0$). In addition, some indication of rainfall is necessary to derive the irrigation ET, from the reference evapotranspiration value ($ET_0$). A dynamic evapotranspiration irrigation water need model is then constructed for the property (step 306). This irrigation water need model can be used as a reference for comparing the actual water usage at the property to determine irrigation watering efficiency, either historically, or in near real time. Hence, using the irrigation water need model with the historical weather data and usage/billing statements, a historical water usage analysis is produced, as, for example, a comparison of the historic actual water usage vs. historic plant water need (step 308). This analysis provided the property owner with a basis for assessing the past irrigation watering efficiency and a metric for establishing irrigation watering goals for forecasting future plant water need.

With the construction of the dynamic evapotranspiration irrigation water need model, the operation of the irrigation system can be evaluated at any time in the future based on updated weather information and actual water usage. Consequently, each month the actual water usage at client property 120 (step 310) and measured weather data (step 312) are received at irrigation service provider 100, which produces and/or updates the water usage analysis (e.g., the actual water usage vs. water goals as defined by plant water need) (step 314). The process continually iterates through steps 310, 312 and 314 each month until termination.

It is expected that the process depicted in FIG. 3 resides on server or other network computing device under the control of irrigation service provider 100, which may be an irrigation manufacturer, professional irrigation service provider, irrigation distributor, installer, contractor or the like. Access to the process is granted to an administrator for client property 120, such as the property owner or operator, but more likely will be an irrigation professional such as an irrigation distributor, installer, contractor or the like. The irrigation professional will typically offer the irrigation water usage analysis as a service or under a service agreement with and under the direction of the property owner.

Figure 4:
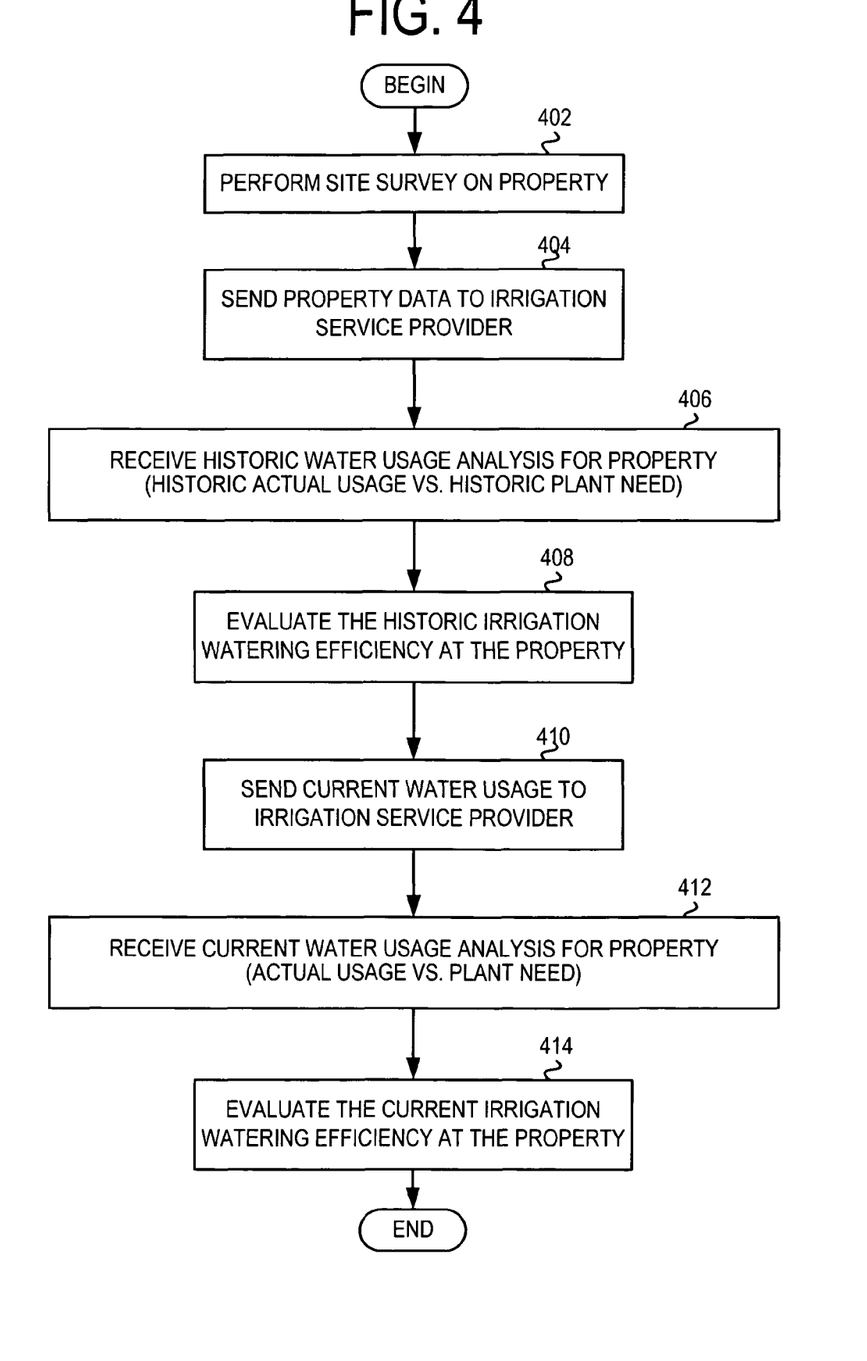
FIG. 4 is a flowchart depicting a process for assessing the operating efficiency of an irrigation system in accordance with one exemplary embodiment of the present invention.

FIG. 4 is a flowchart depicting a process for assessing the operating efficiency of an irrigation system in accordance with one exemplary embodiment of the present invention. The process depicted in FIG. 4 is the corresponding steps to those discussed with respect to FIG. 3, but under the direction of the property owner for client property 120, referred to internally herein as a client of irrigation service provider 100. In other words, the presently described process is initiated and/or performed by an irrigation distributor, installer, contractor or the like engaged by the property owner. The process begins with a site survey to determine the location of the property, irrigation area and to gather historical water usage data for the property (step 402). The property data are then sent to irrigation service provider 100 (step 404) and used for constructing the dynamic evapotranspiration irrigation water need model associated with the property. Next, a historic water usage analysis for property is received by the client as a comparison of historic actual irrigation water usage vs. historic plant water need (step 406). Using the historic water usage analysis, the client can evaluate the historical watering efficiency of the irrigation system at client property 120 (step 408). Next, the client monitors the actual water usage at client property 120, via monthly water usage/billing statements and transmits the actual water usage to irrigation service provider 100 (step 410). In return, the client receives a comparison of the actual current irrigation water usage vs. current plant water need (step 412), from which the client evaluates the current watering efficiency of the irrigation system at client property 120 (step 412). It is expected that the client is granted secure access to the process executing at irrigation service provider 100 over an information network such as the Internet. In so doing, the client can analyze the operating efficiency of the irrigation system operating at client property 120, the costs associated with its operation, project future irrigation watering goals and forecast future operating efficiencies and costs from those goals. Importantly, the construction of the dynamic evapotranspiration irrigation water need model and the irrigation water goals derived therefore, offer the client an accurate metric from which to evaluate all aspects of the operation of the irrigation system. As such, the client has an objective basis for determining situations in which further diagnostics efforts should be undertaken, and can justify such efforts based on return on investment cost analyses associated with the irrigation water goals.

Figure 5:
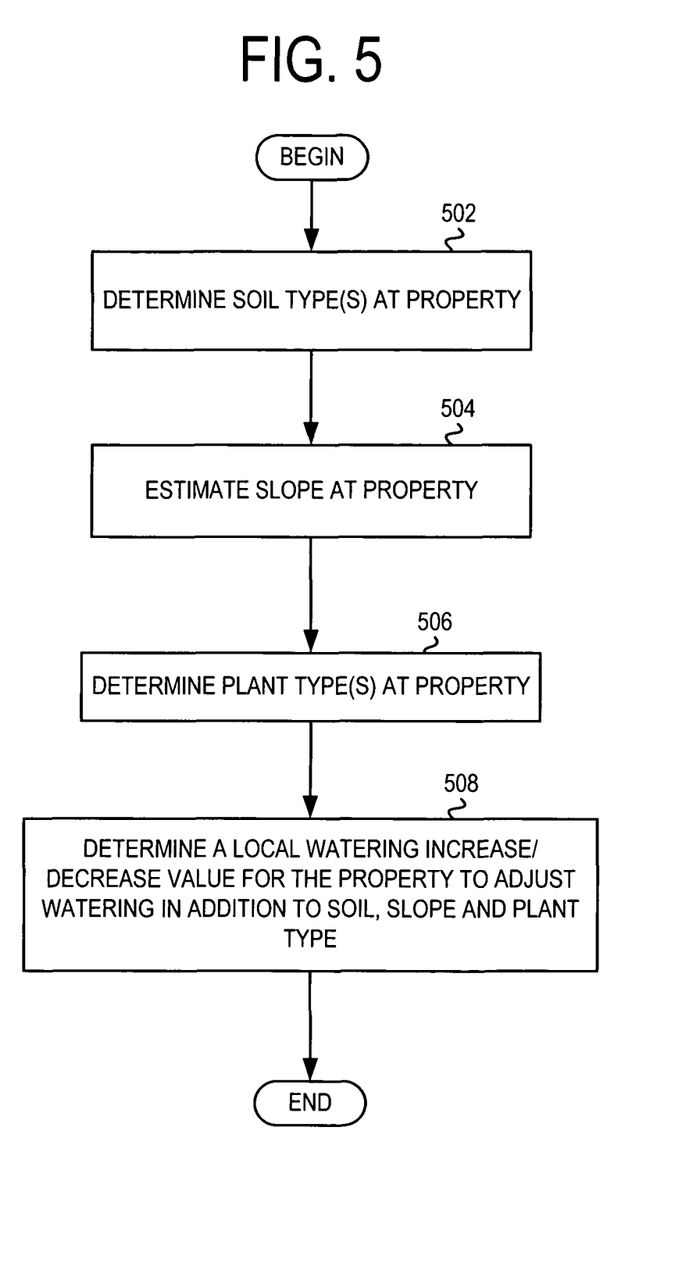
FIG. 5 is a flowchart depicting a process for determining programming parameter values for an advanced irrigation control to ensure proper operation in accordance with one exemplary embodiment of the present invention.

FIG. 5 is a flowchart depicting a process for determining programming parameter values for an advanced irrigation control to ensure proper operation in accordance with one exemplary embodiment of the present invention. Initially, it should be understood that the irrigation system at client property 120 comprises a plurality of separate irrigations zones. Optimally, each zone has been defined such that all programming parameter values as consistent through to irrigation zone, i.e., consistent plant type, slope and soil type. Thus, for each zone the client determines the soil type and programs the controller with the information (step 502), determines the slope and programs the controller with the information, (step 504), determines the plant type and programs the controller with the information, (step 506) and finally determines a local irrigation watering increase/decrease for adjusting the irrigation watering above that of the soil, slope and plant type (step 508).

Figure 6:
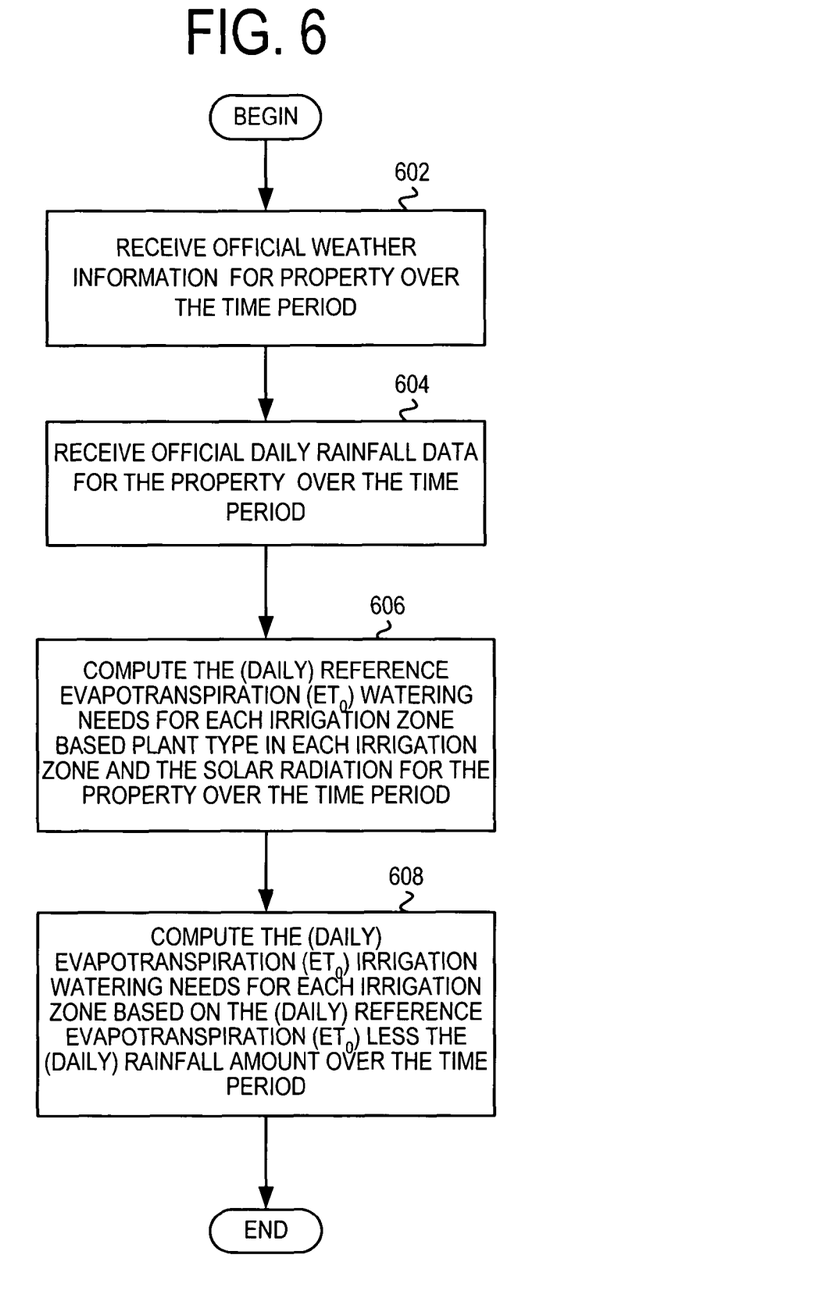
FIG. 6 is a flowchart depicting a process for determining irrigation ET from the reference $ET_0$ employed by the dynamic evapotranspiration irrigation water need model in accordance with one exemplary embodiment of the present invention.

FIG. 6 is a flowchart depicting a process for determining irrigation ET from the reference $ET_0$ employed by the dynamic evapotranspiration irrigation water need model in accordance with one exemplary embodiment of the present invention. The process is executed at irrigation service provider 100 and results are delivered to or accessible by the client. The process begins by receiving official weather data for a time period for property 120 (step 602). This data may come as real time measures weather data from weather station 112 or may reside in historical weather data archive 114. Next, irrigation service provider 100 receives solar radiation data for the property (step 604). Utilizing an uncomplicated evapotranspiration algorithm, such as the Hargreaves equation, only mean temperature data is needed for the property to calculate a reference evapotranspiration value ($ET_0$). Next, a reference evapotranspiration value ($ET_0$) is calculated for the property (step 606). Typically, the reference evapotranspiration value ($ET_0$) is applicable for every irrigation zone, however may be modified for the type of pants in each irrigation zone by the application of a crop factor ($K_c$) to the reference evapotranspiration value ($ET_0$). This value is the total water need of the plants in the irrigation zone. The irrigation water need for the plants in the zone is the amount of water needed to satisfy total water need over any precipitation that occurred at the property (step 608). The plant irrigation water need for the property is irrigation water need times the area of the property, or the cumulative areas of each irrigation zone times the plant irrigation water need for plants in the respective zone.

Figure 7:
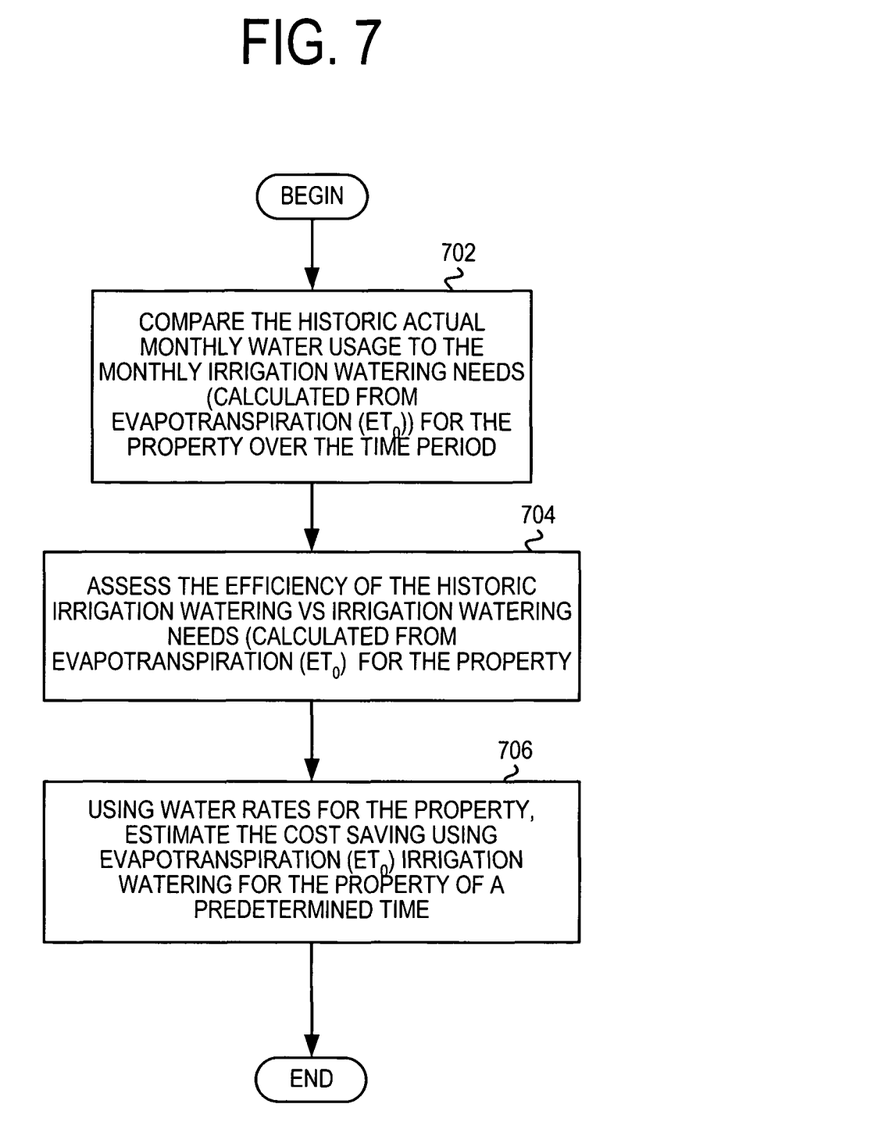
FIG. 7 is a flowchart depicting a process for determining irrigating inefficiency as a monetary value in accordance with one exemplary embodiment of the present invention.

Finally, construction of the dynamic evapotranspiration irrigation water need model serves many purposes, not the least of which is for measuring the cost of irrigation watering inefficiencies. The inefficiency of an irrigation system can display diagrammatically as demarcation in a plot of actual water usage and a plot of plant water need, shown in FIG. 8 as actual water usage 802 (monthly water usage/billing statements) and plant water need 804 (dynamic evapotranspiration ($ET_0$) irrigation water need model). This difference can be converted to a momentary value by applying a water rate schedule to the difference amount. FIG. 7 is a flowchart depicting a process for determining irrigating inefficiency as a monetary value in accordance with one exemplary embodiment of the present invention. The process begins by comparing the historic actual monthly water usage to the monthly evapotranspiration ($ET_0$) irrigation watering needs for the property over the time period (step 702). Next, the efficiency of the irrigation system on the property can be assessed by comparing the historic actual water usage to the water need as determined by the evapotranspiration value (ET) for the property (step 704). The inefficiency can be represented as an amount of irrigation water above what is needed by the plants at the property. Finally, a cost savings can be estimated for using only the evapotranspiration (ET) irrigation watering for the property applying the water rates for the property to the amount of irrigation water above what is needed by the plants at the property (step 706). It expected that this cost savings may be approached by upgrading a legacy irrigation controller with an advanced evapotranspiration irrigation controller. When the cost savings is compared to the cost of upgrading, return on investment may be understood, as can the resulting payoff period for the equipment. The property owner can then determine if the cost savings justifies the expenditures.

Figure 8:
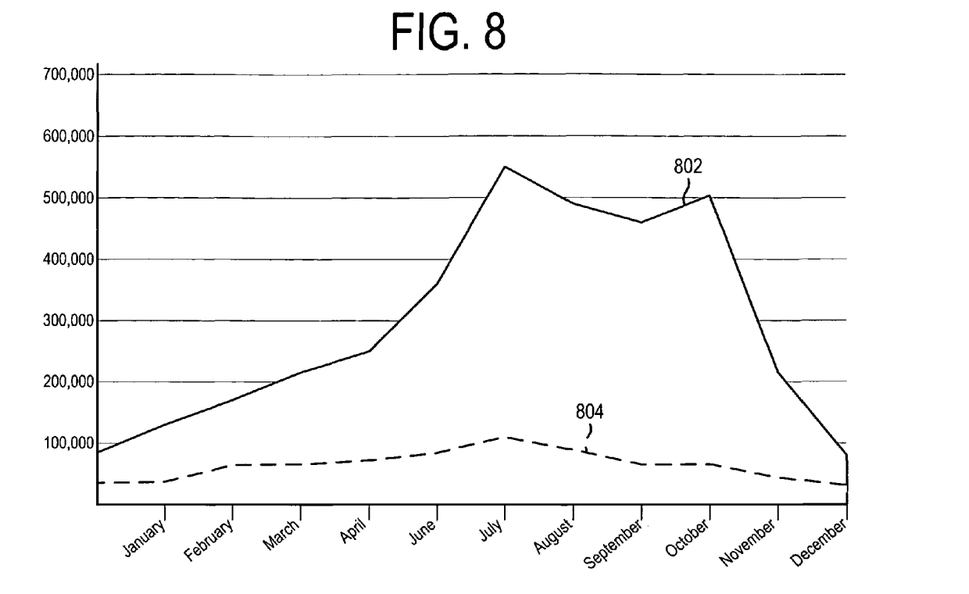
FIG. 8 is a diagram of the actual water usage (monthly water usage/billing statements) and plant water need (dynamic evapotranspiration ($ET_0$) irrigation water need model)
Figure 9:
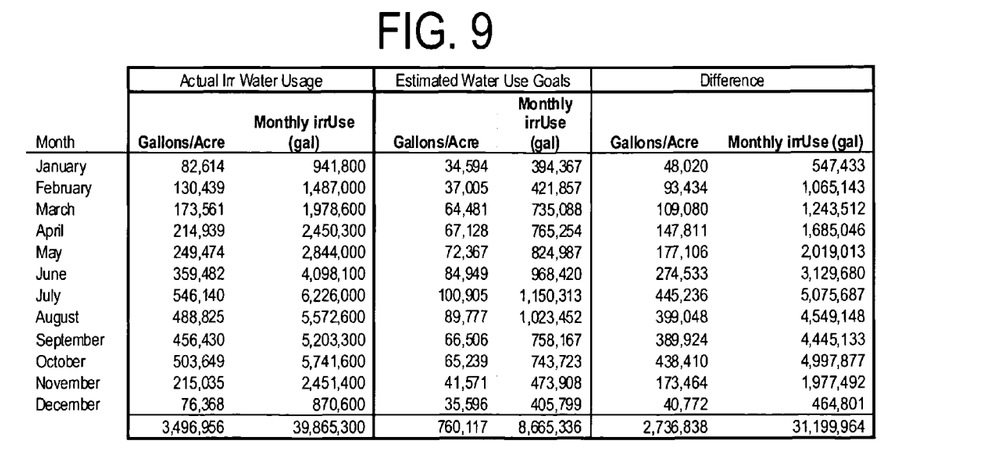
FIG. 9 is a tabular listing of the actual water usage (monthly water usage/billing statements) and plant water need (dynamic evapotranspiration ($ET_0$) irrigation water need model)

FIG. 8 is a diagram of the actual water usage (monthly water usage/billing statements) and plant water need (dynamic evapotranspiration ($ET_0$) irrigation water need model) and FIG. 9 is a tabular listing of the actual water usage (monthly water usage/billing statements) and plant water need (dynamic evapotranspiration ($ET_0$) irrigation water need model) for the diagram illustrated in FIG. 8, both in accordance with various exemplary embodiments of the present invention. As discussed elsewhere above, the actual irrigation water used at a property 802 often substantially exceed that plant water need 804 for the plants on the property. The reasons for this disparity are many and varied, as discussed above, however that the problem with prior art irrigation monitoring is that the property owner does not have a metric from which to compare the volume of irrigation water used at a property 802 with the volume of water needed by the plants at the property 804. Hence, most property owners, managers and operators do not suspect that the volume of water usage is much greater than the volume that is necessary for plant health. As a consequence, many property managers tend to restrict funding for equipment upgrade projects, but readily justify high water usage costs. The present applicants have discover that this assumption is not only incorrect, but due to a multiplicity of factors, many properties can not only economically justify upgrading irrigation components, but would benefit from lower water usage costs as a result of the upgrades. A comparison of the actual water usage 802 to the plant water need 804, demonstrates that a substantial cost savings can be realized by merely reducing the water used for irrigation to correspond to the water need. Furthermore, as may be apparent for the illustration, the return on investment is almost immediate because of the amount of irrigation water that is often wasted on a typical property, see the table in FIG. 9 for differences. As such, most commercial properties can not only benefit from plant need estimates, these results may also justify the engagement of a professions irrigation service to monitor water usage and tract the results of improvements to the system.

Figure 10:
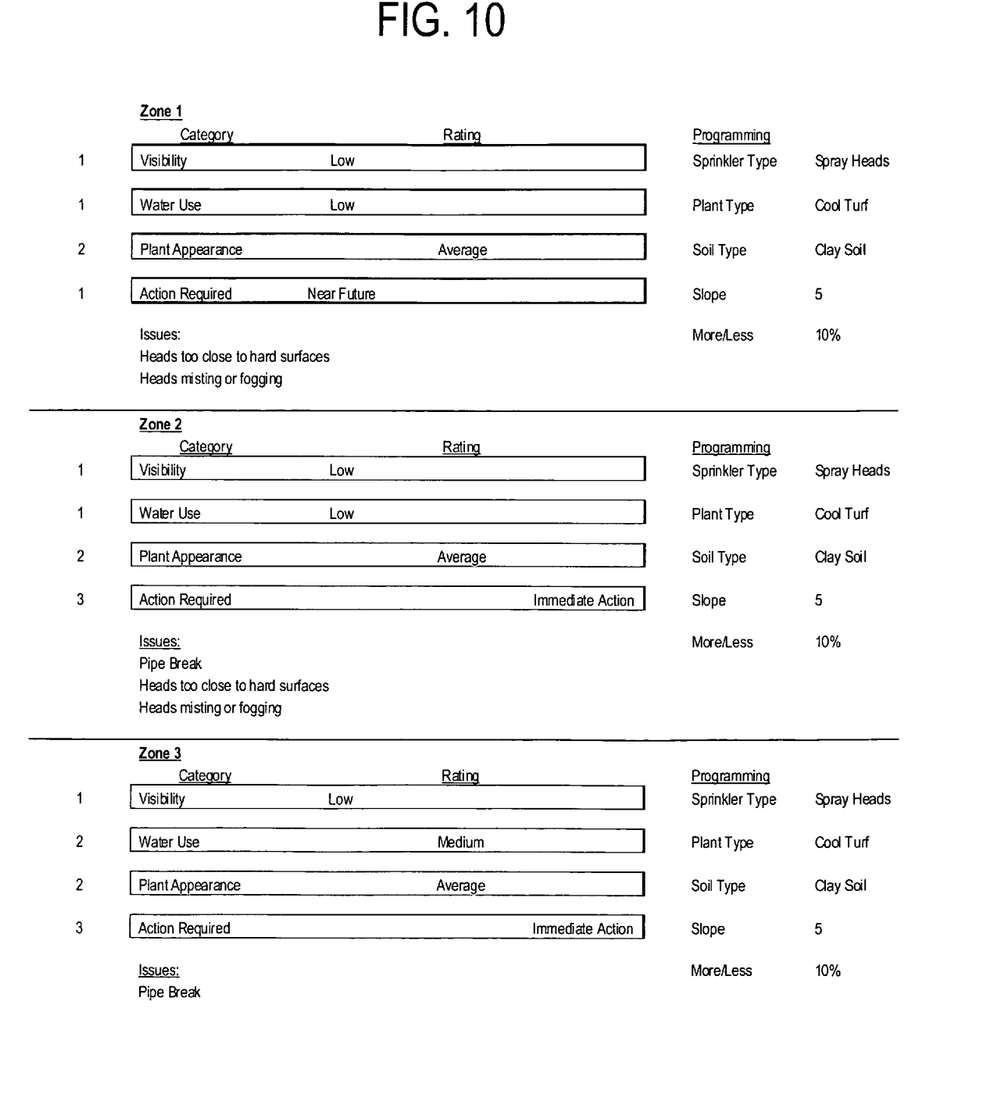
FIG. 10 is a summary diagram for controller A.

The engagement of a professional irrigation service may improve all aspects of irrigating the property, from operation of the irrigation system, maintenance of the system, selecting upgrade irrigation system components and implementing same, to monitoring the operation of the system on a regular and ongoing basis and communication understandable results to the property owner. FIG. 10 is a summary diagram for an exemplary irrigation controller in accordance with aspects of the present invention. The diagram represents a irrigation compilation of results for a property owner or the like. In accordance with one exemplary embodiment of the present invention, an irrigation profession utilizes the irrigation water usage efficiency (as illustrated in FIGS. 8 and 9 above), with a manual site survey of the property to manually compile the summary. Alternately, by using the irrigation water usage efficiency and the operational parameters and site information provided by the property owner and/or and irrigation service professional, a summary may be generated automatically which provides operating and maintenances clues for increasing the efficiency of the irrigation system. Optimally, critical operating and maintenance conditions are emphasized in the summary to lessen the chance of being overlooked.

Initially it should be understood that many commercial properties utilize multiple irrigation controllers, each separately regulated by a unique water supply/meter and each controlling a plurality of separate irrigation zones. Each irrigation zone is evaluated independently based on at least three criteria: ratings for several categories of zone information, the operating parameter values for the irrigation controller (programming parameters in the figure) and maintenance issues for the zone. Initially, an irrigation professional makes a site survey of the irrigation zones on the property and classifies each irrigation zone by visibility (HIGH—in full public view, MEDIUM—some public view, or LOW—little or nor public view). Obviously, maintenance and operation of the highly rated irrigation zones take precedence over lower rated zones. Hence, more attention and resources are usually allocated to irrigation zones with a HIGH rating.

Each irrigation zone is rate by water usage, HIGH, MEDIUM or LOW. The water use rating will vary depending on various factors such as the type of plants in the zone, but may also be influenced by other operating factors such as improper operating parameter values, improper spay patterns, or spay, broken or leaking irrigation pipes, spray heads or valves. The latter should be investigated and corrected in order to keep the actual irrigation water use in line with the water need of the plants in the irrigation zone. Next, the appearances of each the plants in the irrigation zone is rated (POOR, AVERAGE, ABOVE AVERAGE). Most property owners would prefer a correlation between visibility and appearance, plants with higher visibility having above average appearance.

Finally, the irrigation professional rates the zone by the immediacy of maintenance, or Action Required for the zone (IMMEDIATE, MONTH, or NEAR FUTURE). This rating may be fairly subjective based on a combination of conditions in the irrigation zone. For instance, a zone with POOR plant appearance may dictate either and IMMEDIATE, MONTH, or NEAR FUTURE rating based on the visibility and the maintenance issues observed at the zone. However, a broken irrigation pipe will almost always necessitate an Immediate Action rating. Zones with HIGH water usage ratings will generally require more immediate action, and hence a more urgent rating, than zone with lower water usage, provided that the plant appearances is AVERAGE.

The operating parameter values are typically used for as input parameters setting for an advances irrigation controller, such as the SmartLine series of controllers. Essentially, the site conditions for each zone is determines, such as the SPRINKLER TYPE, PLANT TYPE, SOIL TYPE, SURFACE SLOPE and a LOCAL CONSTANT for Increasing/Decreasing the amount of irrigation water/time. Aside from the plant type and local constant variables, the irrigation controller inputs generally do not change the amount of irrigation water, but alter the delivery times. For example, the irrigation water delivered to a zone with a significant slope is delivered as multiple, but shorter irrigation intervals, with time for percolation there between, to lessen the amount of runoff. The same is true for clay soils, several short and spaced irrigation intervals rather than longer irrigation time that might cause water pooling and excessive runoff and/or evaporation. Optimally, once values for the operating parameters have been set, they should remain constant unless the plants are changed or the Visibility rating is altered.

Finally, maintenance issues for the zone are identified. Importantly, the maintenance issues may be hidden or obvious. One advantage of the present invention is to provide a basis from which to investigate inefficient irrigation water usage. Rather than merely relying on the appearance of the plant on the property and investigating only obvious malfunctions, the present invention provides user, property owners and irrigation service professionals to diagnose hidden irrigation system malfunctions such as faulty valves and cracked or broken irrigation pipes. This criterion is represented in the summary as maintenance issues for the zone. Optimally, the summary will suggests potential maintenance issues for the zone based on water usage, operating parameters and some casual observations from the zone. For example, if the plant appearance is POOR, but water usage MEDIUM, the summary may suggest checking the water pressure and spray patterns of the sprinklers at the zone. Obviously, there will be occasions in which the summary cannot accurately predict the most critical maintenance, however this will often be attributable to poor or incorrect zone design and require further analysis by the irrigation profession.

The exemplary embodiments described below were selected and described in order to best explain the principles of the invention and the practical application, and to enable others of ordinary skill in the art to understand the invention for various embodiments with various modifications as are suited to the particular use contemplated. The particular embodiments described below are in no way intended to limit the scope of the present invention as it may be practiced in a variety of variations and environments without departing from the scope and intent of the invention. Thus, the present invention is not intended to be limited to the embodiment shown, but is to be accorded the widest scope consistent with the principles and features described herein.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Moreover, the computer readable medium may include a carrier wave or a carrier signal as may be transmitted by a computer server including internets, extranets, intranets, world wide web, ftp location or other service that may broadcast, unicast or otherwise communicate an embodiment of the present invention. The various embodiments of the present invention may be stored together or distributed, either spatially or temporally across one or more devices.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

What is claimed is:

1. A method for determining the operating efficiency of an irrigation system comprising:
    identifying a remotely located property, said remotely located property having an irrigation system for regulating an actual irrigation water usage volume for irrigating an irrigated area of the remotely located property;
    calculating, at the irrigation system located at the remotely located property, the actual irrigation water usage volume;
    regulating, at the irrigation system located at the remotely located property, the actual irrigation water usage volume calculated by the irrigation system for irrigating the irrigated area of the remotely located property;
    receiving property data for the remotely located property at a local computer from a remotely located computer, said property data comprising at least a location description of said remotely located property and the irrigated area of said remotely located property;
    receiving climatic data for the remotely located property from a source other than the irrigation system located at the remotely located property, said climatic data determined by the location description of said remotely located property;
    receiving the actual irrigation water usage volume for the remotely located property for a predetermined time period;
    calculating, by the local computer, a reference plant water usage for the irrigated area of the remotely located property using the climatic data for the predetermined time period using the property data and at least a portion of the climatic data;

calculating, by the local computer, a water need volume for the remotely located property over the predetermined time period from the reference plant water usage and the irrigated area of said remotely located property;

comparing, by the local computer, the water need volume and the actual irrigation water usage volume for the remotely located property for the predetermined time period; and forwarding results of the comparison for the irrigation system to one of the remotely located computer and a second remotely located computer.

2. The method recited in claim 1, comparing the water need volume and the actual irrigation water usage volume further comprises:

assessing an operating efficiency of the irrigation system at the remotely located property for the predetermined time period as a difference of the water need volume and the actual irrigation water usage volume.

3. The method recited in claim 2, further comprises:

receiving a water rate for the remotely located property for the predetermined time period; and assessing a cost of the operating efficiency of the irrigation system as the difference of the water need volume and the actual irrigation water usage volume using the water rate for the remotely located property for the predetermined time period.

4. The method recited in claim 3, further comprises:

estimating a cost for upgrading irrigation components at the remotely located property; and determining a return on investment for the cost for upgrading irrigation components based on the cost for upgrading irrigation components at the remotely located property and the cost of the operating efficiency of the irrigation system.

5. The method recited in claim 3, wherein the predetermined time period is one of a specific calendar month, a specific water billing cycle, a plurality of specific calendar months and a plurality of specific water billing cycles.

6. The method recited in claim 5, further comprises:

assessing a cost of the operating efficiency of the irrigation system as the difference of the water need volume and the actual irrigation water usage volume using the water rate for the remotely located property for the one of a specific calendar month, a specific water billing cycle, a plurality of specific calendar months and a plurality of specific water billing cycles.

7. The method recited in claim 2, further comprises:

assessing irrigation system input parameter values for one of sprinkler type, plant type, soil type, surface slope and local water correction factor based on the operating efficiency of the irrigation system.

8. The method recited in claim 2, further comprises:

investigating irrigation system maintenance issues based on the operating efficiency of the irrigation system.

9. The method recited in claim 2, further comprises:

investigating irrigation system operating parameters based on the operating efficiency of the irrigation system.

10. The method recited in claim 2, further comprises:

investigating upgraded irrigation system components based on the operating efficiency of the irrigation system.

11. The method recited in claim 1, further comprises:

identifying a second remotely located property, said second remotely located property having a second irrigation system for regulating a second actual irrigation water usage volume for irrigating a second irrigated area of the second remotely located property;

receiving second property data for the second remotely located property at a local computer from a second remotely located computer, said second property data comprising at least a second location description of said second remotely located property and the second irrigated area of said second remotely located property;

receiving second climatic data for the second remotely located property from the source other than the second irrigation system located at the second remotely located property, said second climatic data determined by the second location description of said second remotely located property;

receiving a the second actual irrigation water usage volume for the second remotely located property for a second predetermined time period, said second actual irrigation water usage volume being calculated by the second irrigation system;

calculating, by the local computer, a second reference plant water usage for the second irrigated area of the second remotely located property using the second climatic data for the second predetermined time period irrigate area of the remotely located property using the climatic data for the predetermined time period using the second property data and at least a portion of the second climatic data;

calculating, by the local computer, a second water need volume for the second remotely located property over the second predetermined time period from the second reference plant water usage and the second irrigated area of said second remotely located property;

comparing, by the local computer, the second water need volume and the second actual irrigation water usage volume for the second remotely located property and forwarding results of the comparison for a second irrigation system to one of the remotely located computer and the second remotely located computer.

12. The method recited in claim 11, comparing the second water need volume and the second actual irrigation water usage volume further comprises:

assessing a second operating efficiency of the second irrigation system at the second remotely located property for the second predetermined time period as a difference of the second water need volume and the second actual irrigation water usage volume.

13. The method recited in claim 11, wherein the second location description of said second remotely located property comprises one of longitude, latitude, ZIP code and physical address.

14. The method recited in claim 1, wherein the location description of said remotely located property comprises one of longitude, latitude, ZIP code and physical address.

15. The method recited in claim 14, wherein the remotely located property is under the control of a first property owner and the second remotely located property is under the control of a second property owner.

16. The method recited in claim 1, wherein said climatic data is historic climatic data for a geographical area from a climatic database indexed by location description.

17. The method recited in claim 1, further comprises:

receiving rain fall amount for the remotely located property for the predetermined time period;

calculating a rain fall volume for the remotely located property for the predetermined time period; and modifying the water need volume with the rain fall volume for the remotely located property for the predetermined time period.

18. The method recited in claim 1, wherein said remotely located property data further comprises a quantity of irrigation zones and for each irrigation zone, an irrigation zone irrigated area and a plant type, the method further comprises:
    determining a crop factor corresponding to each plant type for each of the irrigation zones;
    modifying the reference plant water usage for each irrigation zone with a crop factor; and
    calculating the water need volume for the remotely located property from the irrigation zone irrigated areas for each of the irrigation zones and the respective modified reference plant water usages for each of the irrigation zones.

19. The method recited in claim 1, wherein the local computer is under the control of one of an irrigation distributor, an irrigation manufacturer and an irrigation service provider.

20. The method recited in claim 1, wherein the climatic data comprises at least one of temperature data, solar radiation data, wind speed data, vapor pressure data and humidity data.

21. The method recited in claim 1, wherein the climatic data comprises at least temperature data.

22. The method recited in claim 1, wherein the climatic data is received from one of a historical database, a weather station and both a historical database and a weather station.

23. The method recited in claim 1, wherein the reference plant water usage is calculated from one of Hargreaves equation, modified Hargreaves equation, Penman-Monteith algorithm and modified Penmans algorithm.

24. The method recited in claim 1, wherein the reference plant water usage is calculated from a selection of one of Hargreaves equation, modified Hargreaves equation, Penman-Monteith algorithm and modified Penmans algorithm and the selection is based on a type of upgraded irrigation components for the remotely located property.

* * * * *